Dec. 18, 1962   R. BECKADOLPH ETAL   3,068,710
TRANSMISSION BELT OF PLASTIC MATERIAL
Filed Dec. 29, 1959   3 Sheets-Sheet 1

INVENTORS
Richard Beckadolph
Walter Niclas

INVENTORS
Richard Beckadolph
Walter Niclas

United States Patent Office 3,068,710
Patented Dec. 18, 1962

3,068,710
TRANSMISSION BELT OF PLASTIC MATERIAL
Richard Beckadolph, Grasdorf uber Hannover, and Walter Niclas, Altwarmbuchen uber Hannover, Germany, assignors to Continental Gummi-Werke Aktiengesellschaft, Hannover, Germany
Filed Dec. 29, 1959, Ser. No. 862,707
Claims priority, application Germany Dec. 2, 1952
2 Claims. (Cl. 74—237)

The present invention relates to a precision transmission belt with meshing teeth, especially a high-speed belt, and is a continuation-in-part application of our co-pending application Ser. No. 369,272, filed July 21, 1953, now abandoned.

More specifically, the present invention relates to a precision transmission belt with reinforcing inserts as it may be used for instance as transmission belt between a sewing machine unit and the motor therefor. It stands to reason that such a belt equipped with meshing teeth will work properly only, if it is true to size which means that if the spirally wound reinforcing inserts for instance in form of reinforcing wires are precisely located within the belt body and firmly anchored thereto and if the meshing teeth are evenly spaced from each other and have the proper width. It should be noted that the tolerances of such a belt must be within fractions of millimeters if the above requirements are to be met.

It will also be obvious that any belt which is not initially made endless and seamless can impossibly meet these high precision requirements. In other words, a belt made as a belt with two ends and subsequently spliced and/or fused cannot meet these high precision requirements. Furthermore, in order to be able to meet such high precision requirements, the belt must on one hand contain non-stretchable reinforcing inserts, but on the other hand must be as thin as will be permissible under the circumstances to meet the requirements of strength so that the belt will be highly flexible. Unless the belt is highly flexible, the necessary precision requirement cannot be met.

Various attempts have heretofore been made in an effort to produce high precision belts of the above general type, however, the methods employed were too complicated and, consequently, the belts were too expensive, aside from the fact that also the quality of the belts did not always come up to the required standards.

It is, therefore, an object of the present invention to provide a precision belt which will overcome the above mentioned drawbacks.

It is another object of this invention to provide a precision belt which will be extremely thin, highly flexible, substantially non-stretchable and in which the teeth which may be of any desired shape or type will have absolutely the same gear modulus.

These and other objects and advantages of the invention will appear more clearly from the followings specification in connection with the accompanying drawings, in which.

*General Arrangement*

Figure 1:
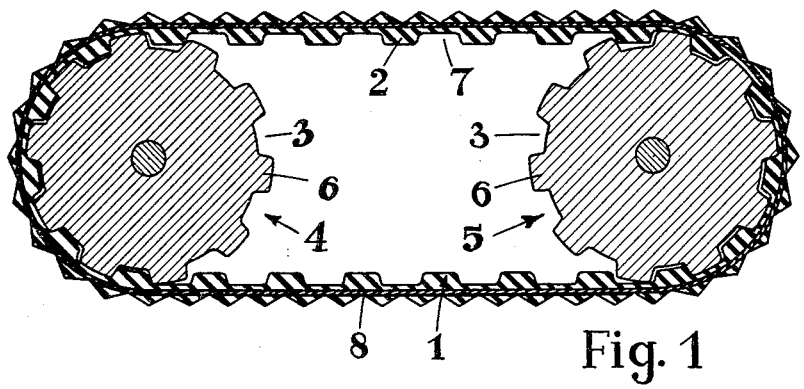
FIG. 1 is a section through a precision belt according to the present invention and the pulleys meshing therewith.

As stated above, any belt not made endless initially as a unit cannot yield a precision belt of the general type set forth above. Similarly, it will also be obvious that any belt made by placing one layer upon the other layer cannot meet the precision requirements of a belt as contemplated by the present invention. Therefore, the problem underlying the present invention, namely to provide a precision belt of the above mentioned type has been solved by providing an endless and seamless belt which is characterized primarly by the following features:

(a) The belt is made of pourable or castable material, preferably of a material selected from the group consisting of polyurethanes and polyamides.

(b) The reinforcing means consist of a single layer of wires extending in longitudinal direction of the belt and wound along the entire length of the belt. The wires may be arranged directly adjacent each other or may be spaced from each other in transverse direction of the belt. The thickness of the wires may vary in conformity with the specific purpose of the belt, its width and the number of windings over the width. As a mere example, a belt having a thickness of 1 millimeter at its thinnest portions and having a total length of 600 millimeters and having 12 windings over a width of 10 millimeters, may have as an insert a wire of a diameter of 0.3 millimeter.

If the said wires were on the dedendum line of the teeth which have to mesh with the part to be driven, not only would the belt along said teeth be stiffened but, worst of all, after only a slight wear, the reinforcing wires would be in direct contact with the element to be driven with the result that the wires would quickly wear so that the belt would become worthless and would have to be discarded.

(c) Therefore, another outstanding feature of the belt according to the present invention consists in that the reinforcing wires are spaced from the dedendum line of said teeth by a layer of the castable or pourable material of which the belt is made. The thickness of such layer may, of course, vary depending on the thickness of the respective belt. Thus, with a belt having a thickness of 1 millimeter, said layer may, for instance, have a thickness of 0.7 millimeters.

(d) According to a preferred embodiment of the present invention, the reinforcing wires have portions thereof spaced in longitudinal direction of the belt, exposed on the back of the belt, while the intermediate portions of said wires are anchored to the back of the belt by transverse elevations or ridges between said exposed wire portions. Thus, the wires are actually placed on the outside of the belt so as to be farthest away from the dedendum line of the teeth and can be felt from the outside of the belt between the ridges.

In this way, a maximum flexibility of the belt is obtained which, as will be evident from the above, consists of said pourable or castable material in solidified form and of the reinforcing wires only. Thus, limiting the belt to these two items only, the belt can be made as thin and as strong and simultaneously as flexible as possible and, thereby, can be made so as to meet the extreme requirements of precision outlined above.

Structural Arrangement

Figure 2:
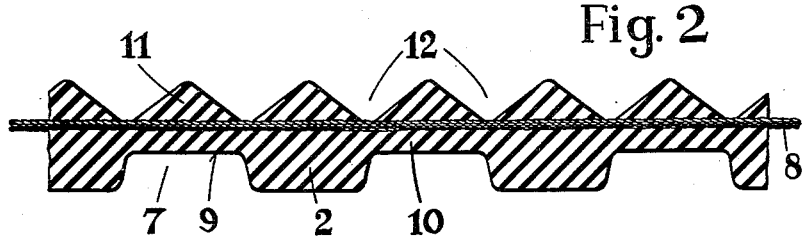
FIG. 2 is a longitudinal section through a portion of a belt according to FIG. 1 but on a scale considerably enlarged over that of FIG. 1.
Figure 3:
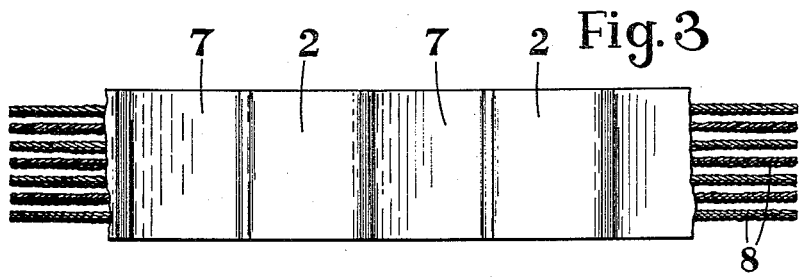
FIG. 3 is a portion of the bottom view of the belt shown in FIG. 1 but on a somewhat enlarged scale with regard to FIG. 1.

Referring now to the drawings in detail, and FIGS. 1 and 2 thereof in particular, FIG. 1 shows a belt according to the present invention and generally designated with the reference numeral 1. This belt is provided with precision teeth 2 which mesh with tooth spaces 3 of pulleys 4 and 5, while the teeth 6 of said pulleys mesh with corresponding tooth spaces 7 of belt 1. As will be evident from FIGS. 1 and 2, belt 1 is provided with reinforcing means in form of a wire 8 which is spirally wound throughout the length of the entire belt so that the individual windings are spaced from each other in transverse direction of the belt (see FIG. 3). Inasmuch as it is well-known in the art spirally to wind wire inserts for belt, a corresponding showing has been considered superfluous.

Figure 4:
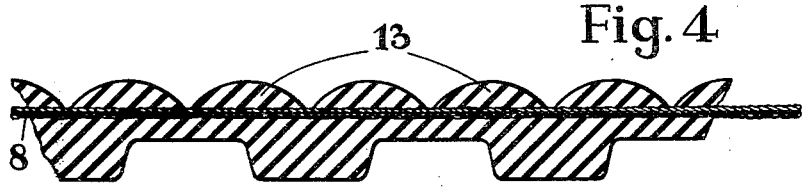
FIG. 4 is a longitudinal section through a portion of a belt according to the invention which is somewhat modified over that of FIG. 2.

As will also be evident from FIGS. 1 and 2, the wire 8 is spaced from the dedendum line 9 by a layer 10. Actually the wire 8 is placed on the back of the belt and held thereon by ridges 11 which are spaced in longitudinal direction of the belt so that longitudinally spaced portions 12 of the wire are exposed toward the outside and can actually be felt from the outside by the fingernail. While according to FIG. 2 the ridges 11 are of a triangular cross section, it is, of course, to be understood that these ridges which anchor the reinforcing wire to the back of the belt may also be of different cross section. Thus, the anchoring parts 13 of the modification shown in FIG. 4 are of a segmental shape.

Figure 5:
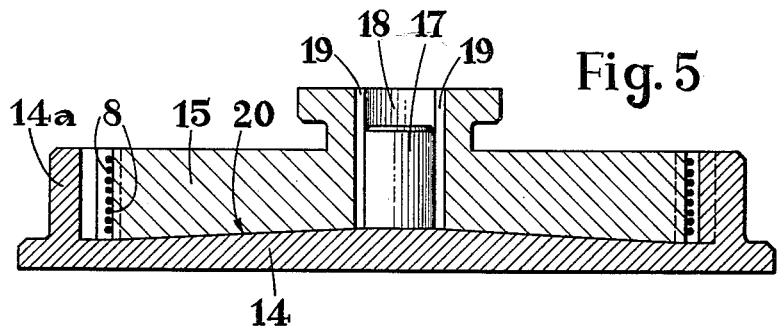
FIG. 5 is a mold for use in connection with the making of a belt according to the invention.

The belt shown in FIGS. 1 to 4 consists of pourable or castable material, preferably of a material selected from the group consisting of polyurethanes and polyamides, and can easily be produced in a relatively inexpensive manner for instance by a mold shown in FIG. 5. This mold comprises two portions, namely an outer portion 14 and an inner portion 15. The inner contour of the outer portion 14 corresponds to the contour of the teeth of the belt to be made, as is particularly clearly shown in FIG. 6 for a belt of the type shown in FIGS. 1 and 2. The outer contour of the inner portion 15 corresponds to the outer contour of the belt shown in FIGS. 1 and 2. As will be clearly evident from FIG. 6, the portions 16a of the ridges 16 serve as supporting means for the wire 8 when the latter is tightly wound around the inner portion or mandrel 15.

The outer portion 14 of the mold with its annular flange-like portion 14a has centrally connected thereto a guiding member 17 which receives a bore 18 of the inner mold portion 15. The said bore 18 is furthermore provided with venting grooves 19.

As will also be evident from FIG. 5, the bottom of the outer mold portion 14 has an inclined surface 20, while the bottom surface of the inner mold portion 15 is inclined accordingly.

Figure 6:
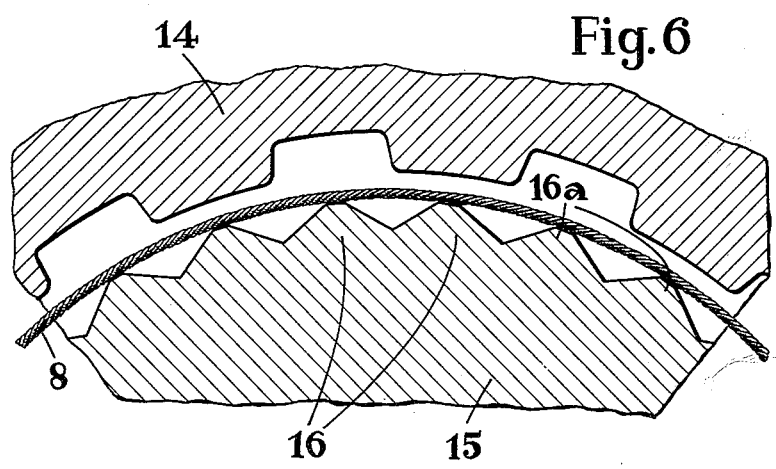
FIG. 6 shows a portion of the mold of FIG. 5 for producing the belt shown in FIGS. 1 and 2.

In order to prepare a belt according to the present invention, the inner mold portion 15 is first removed from the outer mold portion 14. Thereupon, the reinforcing means, for instance the wire 8, is spirally wound around the periphery of the inner mold portion 15 so that the ridges 16a of the respective elevations 16 tightly support the wire as shown in FIG. 6, the spiral windings of said wire being substantially evenly spaced from each other in the direction of the axis of the guiding member 17. After the wire 8 has been properly located on the inner mold, the molten material of which the belt is to be made is poured into the outer mold portion 14, but only up to a certain level. Thereupon, the inner mold portion 15 is inserted into the outer mold portion so that the inner mold portion displaces the poured-in material which later will then move into the space between the outer periphery of the inner mold portion and the inner periphery of the outer mold portion, while air bubbles in the poured material will escape primarily through the venting grooves 19. It is, of course, to be understood that the quantity of material initially poured into the outer mold portion 14 prior to the insertion of the inner mold portion 15 should be such that the excess material displaced from the mold when inserting the inner mold portion will be held to a minimum.

Figure 7:
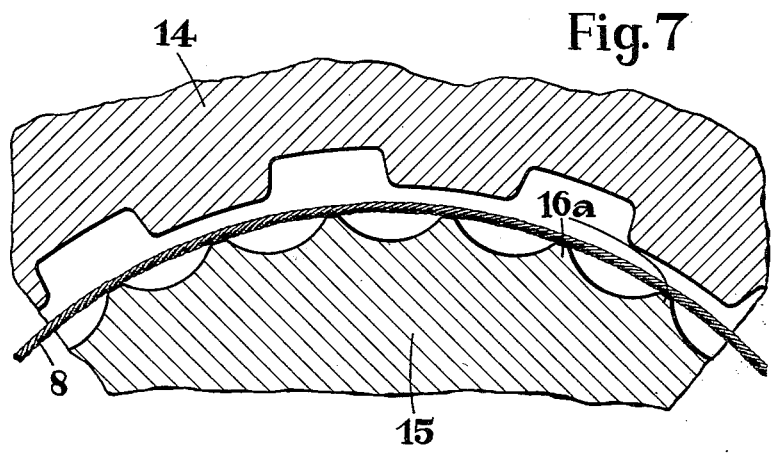
FIG. 7 shows a portion of a slight modification of the mold of FIG. 5 for producing the belt shown in FIG. 4.

The belt shown in FIG. 4 is made according to the same method as just described. In this instance, however, the contour of the periphery of the inner mold portion 16a will, of course, be slightly different, namely as shown in FIG. 7 so as to conform with the anchoring parts 13 of the belt shown in FIG. 4.

Figure 8:
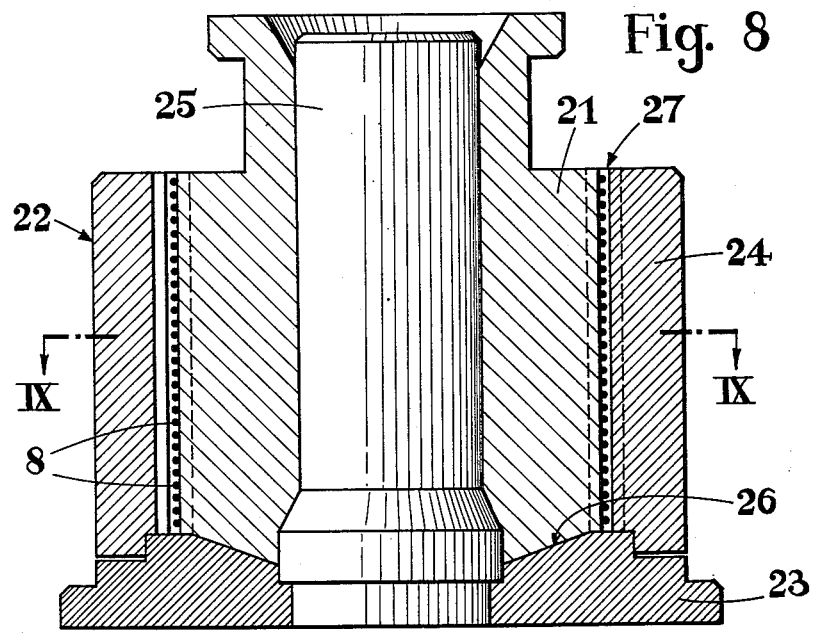
FIG. 8 shows a section through a mold somewhat modified over the mold of FIG. 5 for producing a belt according to FIGS. 1 and 2.
Figure 9:
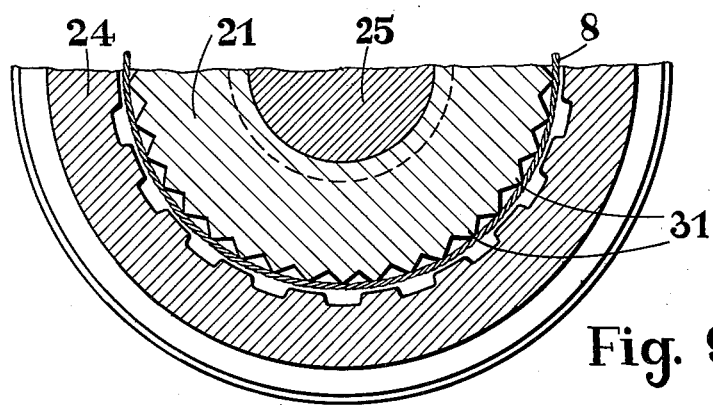
FIG. 9 is a section along the line IX—IX of FIG. 8.

FIGS. 8 and 9 illustrate a modification of the mold shown in FIG. 5. As will be seen from FIGS. 8 and 9, the inner and outer mold portions 21 and 22 are relatively higher with regard to their outer diameters than is the case with the mold of FIG. 5. Furthermore, the outer mold portion 22 consists of a bottom portion 23 having connected thereto, for instance by bolts (not shown in the drawings), an annular portion 24 the inner contour of which corresponds to the teeth of the belt to be formed, in this instance the belt of FIG. 1. The inner mold portion 21 has a peripheral contour corresponding to that of the inner mold portion 15, i.e. corresponding to the contour of the anchoring or ridge portions 11. The bottom portion 23 of the mold of FIGS. 8 and 9 has likewise a central guiding bolt 25 connected thereto for receiving the inner mold portion 21. The top surface 26 of the bottom portion 23 is likewise inclined but in a direction opposite to the direction of inclination of the top surface 20 of the mold of FIG. 5.

The use of the mold of FIGS. 8 and 9 is substantially the same as that described in connection with FIG. 5. However, any air bubbles in the mold or in the material in the mold will in the case of the mold of FIG. 8 escape at 27.

It should be noted that both the molds of FIG. 5 and of FIGS. 8 and 9 remain open after the respective inner mold portions have been fully inserted into their outer mold portions pertaining thereto. In other words, the only pressure acting upon the poured material when the molds are in assembled condition is the atmospheric pressure. This is highly important inasmuch as in this way the wire inserts once tightly wound around the inner mold portion are not subjected to any pressure which could possibly displace the wire inserts. In other words, once the wire inserts have been tightly wound around their respective inner mold portions or mandrels, they will safely stay in their respective positions with the wire windings spaced in the desired manner since during the forming of the belt no pressure is exerted upon the latter except atmospheric pressure. The proper location of the wire inserts is, therefore, assured and maintained and will be retained in the finished belt.

After the poured substance has solidified, the inner mold member is removed from the outer mold member whereupon the belt can be removed. Thereupon, the outside of the formed belt is turned inwardly, and the belt is ready for use.

Figure 10:
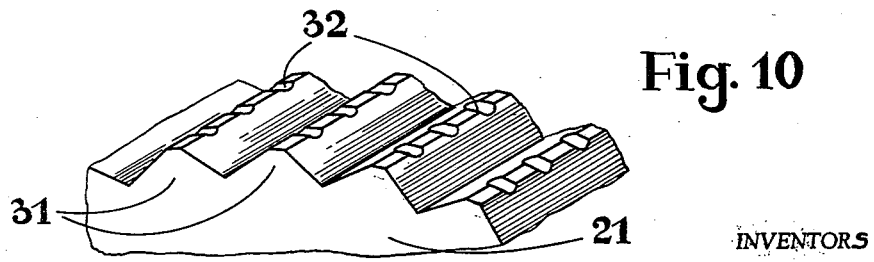
FIG. 10 shows a detail for facilitating the uniform placing of the reinforcing wires on the mold core.

FIG. 10 illustrates a portion of the inner mold body 21 of FIG. 9, and more specifically, shows notches 32 provided in elevations 31 for receiving the reinforcing wire thereby facilitating the proper locating of the wire windings. It is a matter of course that such notches may also be provided in the mold bodies 16 and 16a of FIGS. 6 and 7 respectively.

It is, of course, to be understood that the present invention is, by no means, limited to the particular belt shown in the drawings but also comprises any modifications within the scope of the appended claims.

What we claim is:

1. As an article of manufacture: an endless and seamless precision transmission belt of flexible castable plastic material, said belt being provided with substantially evenly spaced precision teeth for meshing engagement with teeth of a movable member to be driven, said belt teeth consisting only and entirely of the same material as said belt and being integral therewith, and pull-resistant insert means consisting of a plurality of turns extending in the longitudinal direction of said belt, said insert means being spaced from the dedendum line of said teeth in a direction away from said teeth by a layer of said material, said insert means having exposed portions spaced in the longitudinal direction of said belt, and extending transversely thereto, said insert means being anchored to said belt by a series of evenly spaced elevations positioned between said exposed insert portions, said elevations consisting of said material and being integral with said belt, said elevations extending transversely to the longitudinal direction of said belt.

2. As an article of manufacture: an endless and seamless precision transmission belt of flexible castable plastic material, said belt being provided with substantially evenly spaced precision teeth for meshing engagement with teeth of a movable member to be driven, said belt teeth consisting of the same material as said belt and being integral therewith, and a strain resisting member in said belt and composed of a plurality of turns of wire, the windings of said wire being spaced from the dedendum line of said teeth in the direction away from said teeth by a layer of said castable material and having spaced portions along the length thereof exposed toward that side of the belt which is opposite said teeth, said wire being anchored to said belt by a series of evenly spaced elevations positioned between said exposed portions, said elevations consisting of said material, and being integral with said belt, said elevations extending transversely to the longitudinal direction of said belt.

References Cited in the file of this patent

UNITED STATES PATENTS

| | | |
|---|---|---|
| 2,290,109 | Mayne | July 14, 1942 |
| 2,466,951 | Hunter | Apr. 12, 1949 |
| 2,507,852 | Case | May 16, 1950 |
| 2,514,429 | Waugh | July 11, 1950 |
| 2,699,685 | Waugh | Jan. 18, 1955 |

FOREIGN PATENTS

| | | |
|---|---|---|
| 1,193,326 | France | Apr. 27, 1959 |